United States Patent [19]

Imanaga et al.

[11] Patent Number: 5,146,376
[45] Date of Patent: Sep. 8, 1992

[54] TAPE CASSETTE

[75] Inventors: Eisuke Imanaga, Tokyo; Hirokazu Maeda, Osaka, both of Japan

[73] Assignee: Metarex Research Institute Corp., Osaka, Japan

[21] Appl. No.: 634,731

[22] Filed: Dec. 27, 1990

[51] Int. Cl.⁵ .................... G11B 15/66; G11B 23/087
[52] U.S. Cl. ........................................ 360/94; 360/132
[58] Field of Search ................... 360/94, 132; 242/199, 242/198

[56] References Cited

U.S. PATENT DOCUMENTS

| | | | |
|---|---|---|---|
| 4,235,395 | 11/1980 | Wardenaar et al. | 360/132 |
| 4,476,505 | 10/1984 | Ogata et al. | 360/94 |
| 4,479,618 | 10/1984 | Okada et al. | 360/94 |
| 4,621,779 | 11/1986 | Fitterer et al. | 360/132 |
| 4,742,416 | 5/1988 | Oishi et al. | 360/132 |

FOREIGN PATENT DOCUMENTS

1-179290  7/1989  Japan ..................... 360/94

Primary Examiner—Robert S. Tupper
Attorney, Agent, or Firm—Wenderoth, Lind & Ponack

[57] ABSTRACT

A tape cassette has a case accommodating magnetic tape wound around a pair of reel hubs. The case defines tape feed path openings extending through both ends of the case near its front portion from winding openings to a front recess through which a magnetic head or the like is to be inserted. The case has a base portion and top and bottom plates covering top and bottom surfaces of the base portion. The base portion is solid in the direction of its thickness except at the winding opening and the tape feed path openings. The base portion has a front portion and a rear portion contiguous to each other through a bridge extending between the winding openings. The base portion and the top and bottom plates are cut out at portions corresponding to the front recess. The base portion is provided at the front part thereof with guides to guide the magnetic tape. An adaptor may be provided for use with the tape cassette. The adaptor has a case into which the tape cassette is insertable. The case is of a standard size so that the tape cassette can be recorded on or played with a conventional tape recorder.

7 Claims, 7 Drawing Sheets

TAPE CASSETTE

BACKGROUND OF THE INVENTION

This invention relates to a tape cassette having a case which is smaller, especially in thickness, than a conventional tape cassette and which can still accommodate a magnetic tape of the same width as can a conventional tape cassette, and to an adaptor for mounting such a tape cassette to a conventional tape recorder.

Figure 8:
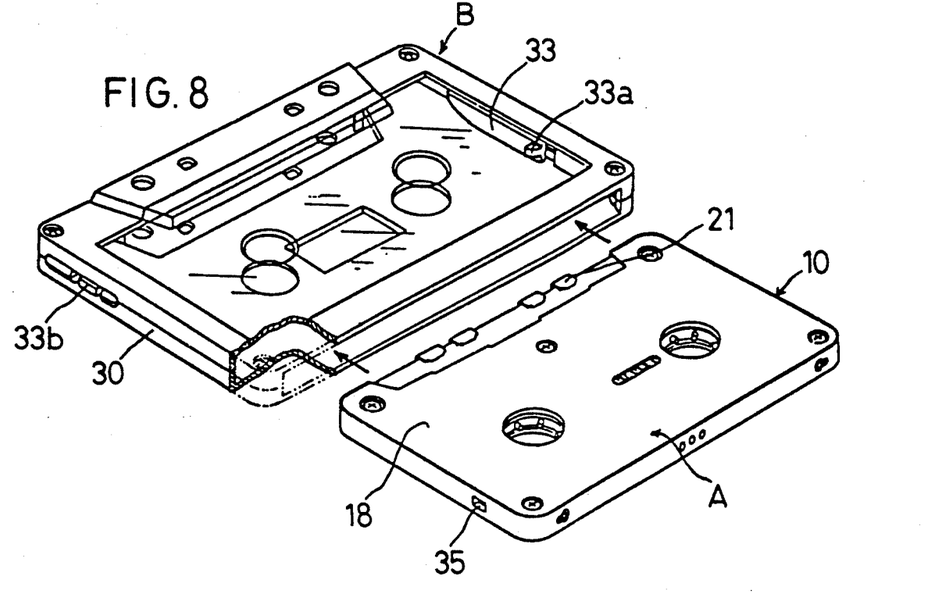
FIGS. 8, 9 and 11 are perspective views of other embodiments of the cassette adaptor.

Among cassette tapes, the most widespread now in use are called compact cassettes, which contain a magnetic tape having a width of 3.8 mm and have a standardized shape and size, i.e. a length of 100 mm, a width of 64 mm and a thickness of 8.5 mm (FIG. 8).

A handy tape recorder for this type of compact cassette is rather small and lightweight. In fact, the latest model is only slightly larger than the cassette itself. In other words, further reduction in size of the hardware part of the tape recorder is almost impossible.

On the other hand, a micro-cassette is known which is extremely small (50 mm in length, 33 mm in width and 8 mm in thickness). But since its sound information recording capacity is smaller than a compact cassette and it cannot feed the tape stably due to its fragile build, its sound quality is considerably poor. Thus, tape recorders for micro-cassettes are not popular in spite of their compact size.

For the above reasons, it is essential, in attempting to realize a reduction in size of a tape cassette, not to impair the sound information recording capacity, not to impair the sound quality and to keep a sufficient strength of the cassette itself.

Also, it is desirable that such a small and thin tape cassette be capable of being recorded with and being replayed on a conventional compact cassette tape recorder.

Japanese Unexamined Patent Publication No. 56-98757 discloses a compact cassette in which a tape cassette is inserted in a case to protect its magnetic tape during transportation and which can be mounted on a tape recorder with the tape cassette received in the case.

Also, Japanese Examined Patent Publication No. 57-58752 discloses a solid type tape cassette having a solid interior except at some portions. It has an increased strength.

SUMMARY OF THE INVENTION

The first object of the present invention is to provide a tape cassette which obviates the abovesaid shortcomings, in which the information recording capacity and the sound quality are satisfactory even though it is thin, and which is sufficiently strong.

The second object is to provide a tape cassette which is very thin but which still can be played on a conventional tape recorder.

The tape cassette according to this invention has a solid base portion, wherein most of the interior thereof is solid. Thus, it has an increased strength compared with the prior art disclosed in Japanese Examined Patent Publication 57-58752, because the front and the rear parts of the solid portion are contiguous to each other through a bridge portion extending between winding portions. The tape is insertable in a tape recorder specifically designed for recording on and replaying the cassette.

The cassette also has closure plates, and defines a recess or opening normally closed by the closure plates, thus protecting that portion of the magnetic tape exposed at the opening.

On the other hand, when the tape cassette having the closure plates is inserted in a cassette adaptor or the tape recorder, the closure plates will abut projections on the cassette adaptor or the tape recorder. Thus, the closure plates will move backwards as the cassette is inserted, exposing the top and bottom of the recess or opening.

Also, with the cassette adaptor having the above-described structure, when the tape cassette is inserted into the case of the adaptor, the closure plates of the tape cassette will abut the projections on the cassette adaptor as described above. As it is further inserted, the closure plates will move backwards, thus exposing the top and bottom of the front recess. When the top and bottom of the recess are exposed, a conventional magnetic head and a pinch roller can be inserted smoothly through the front recess.

According to this invention, since most of the interior of the cassette is solid, it has a sufficient strength even if it is thin. Also, there is no need to use a narrow magnetic tape.

Therefore, according to this invention, a thin tape cassette or what is called a card cassette can be obtained without sacrificing the information capacity and the sound quality. Since the cassette can be relatively thin, the size of the tape recorder can be correspondingly small.

Also, since the front and rear parts of the base portion are contiguous to each other, it has an increased strength compared with the prior art disclosed in Japanese Examined Patent Publication 57-58752. Thus, the cassette has higher rigidity. Further, since no relative positioning between the front and rear parts is necessary, it is reliable.

Further, by providing the closure plates, the tape is less likely to be damaged.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENTS

First, the tape cassette will be described.

In the embodiment shown in FIG. 1, a case 10 comprises a base portion 11 and top and bottom plates 12 and 13 covering the top and bottom surfaces of the base portion 11, respectively. The base portion 11 should be as large as possible. The magnetic tape 1 to be received therein should have the same length and width as the magnetic tape of a compact cassette.

The base portion 11 is made of synthetic resin and defines winding portions 14 and 15 and feed paths 17 extending therefrom at both ends of the front portion of the case 10 to a front recess 16 which is sized to accommodate a magnetic head and the like. Otherwise, the base portion 11 is solid in the direction of its thickness. A front part 11a and a rear part 11b are connected together through a bridge portion defined between the winding portions 14 and 15. Since the parts 11a and 11b are connected together, the case will have an increased strength as the front and rear parts are held in a fixed position relative to each other.

The top and bottom plates 12 and 13 are made of a magnetically permeable and conductive material such as aluminum or stainless steel and are press-formed so that they have the same shape. Such a material has a magnetic shieldability and can discharge static electricity. The plates 12, 13 are formed with cutouts extending along their front edges.

Closure plates 18 made of a magnetically permeable and conductive material for synthetic resin are mounted on the top and bottom surfaces of the base portion 11 at its front part 11a so as to be movable back and forth. They are urged forwardly by springs 20 through stoppers 19 to such a position as to cover the cutouts formed in the top and bottom plates 12 and 13 and thus to define the recess 16 therebetween. Since the front opening of this recess 16 is narrower than a magnetic head or a pinch roller, such cannot be inserted in the recess 16 in this state. But by pushing the closure plates 18 backwards against the springs 20, the magnetic head can be placed in contact with the tape through the cutouts formed in the top and bottom plates 12 and 13.

Tapes guides 21 made of stainless steel are attached to the front surface of the front part 11a of the base portion 11 to guide the magnetic tape smoothly and true. Each tape guide 21 may be divided into two pieces along the centerline thereof as shown in FIG. 1A with one of the divided pieces formed integral with the top and bottom plates 12 and 13 as shown by chain lines in FIG. 4.

Figure 1A:
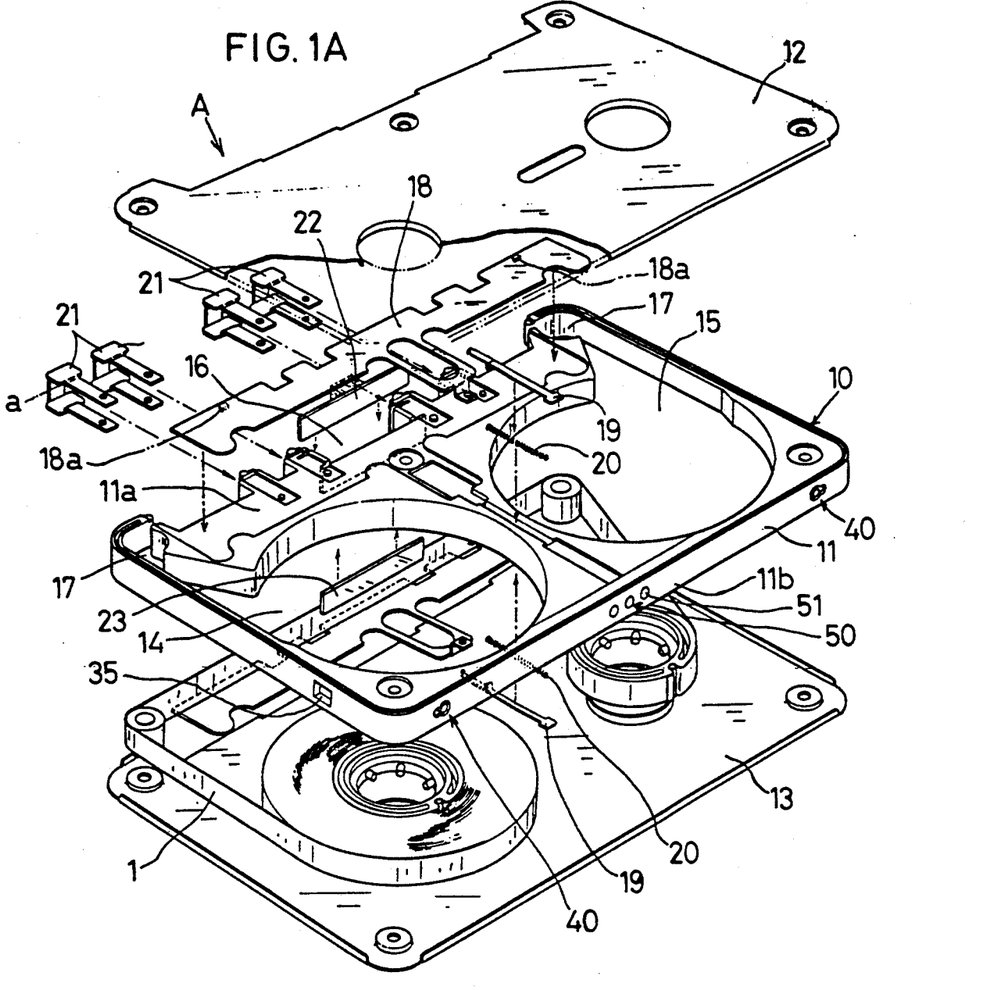
FIG. 1A is an exploded perspective view of one embodiment of the tape cassette according to this invention.
Figure 1B:
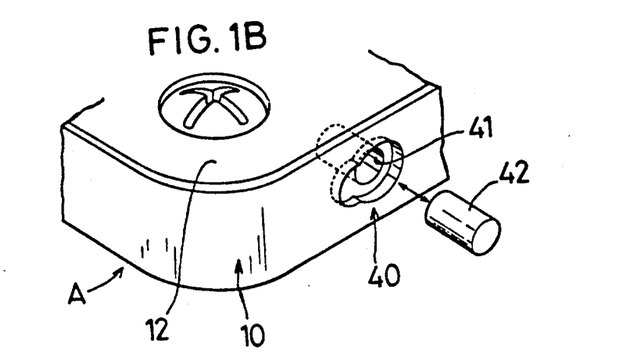
FIG. 1B is an enlarged view of a portion of the cassette shown in FIG. 1A.
Figure 2:
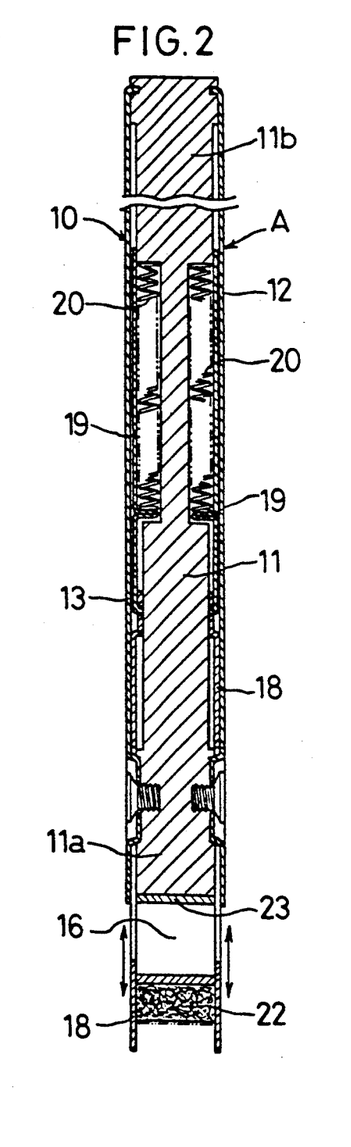
FIGS. 2 and 3 are sectional views of the cassette.
Figure 3:
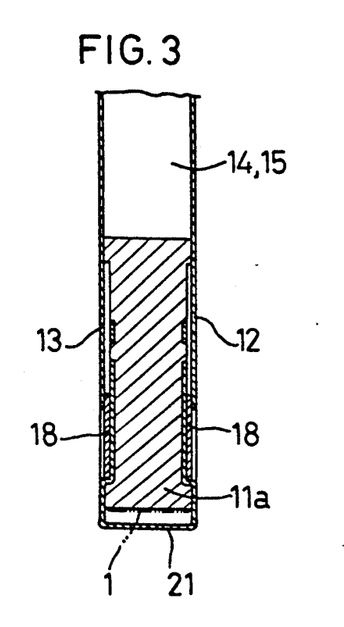

As shown in FIGS. 1A and 1B, means 40 for preventing the recorded sound from being erased and display means 50 indicating the kind of magnetic tape (normal, chrome, etc.) are provided on the rear surface of the rear part 11b of the base portion 11. The erasure preventive means 40 comprises a hole 41 and a plug 42 fitted in the hole 41. By pulling out the plug 42, a claw (of the same type as a conventional one) of the tape recorder protrudes into the hole 41, making recording impossible. The display means 50 (position select means) comprises a hole 51 and a mark such as a magnetic mark.

The mark in the hole is detected by detecting means of the tape recorder.

In the figures, numeral 22 designates a head pad and 23 a stainless patch.

Figure 4:
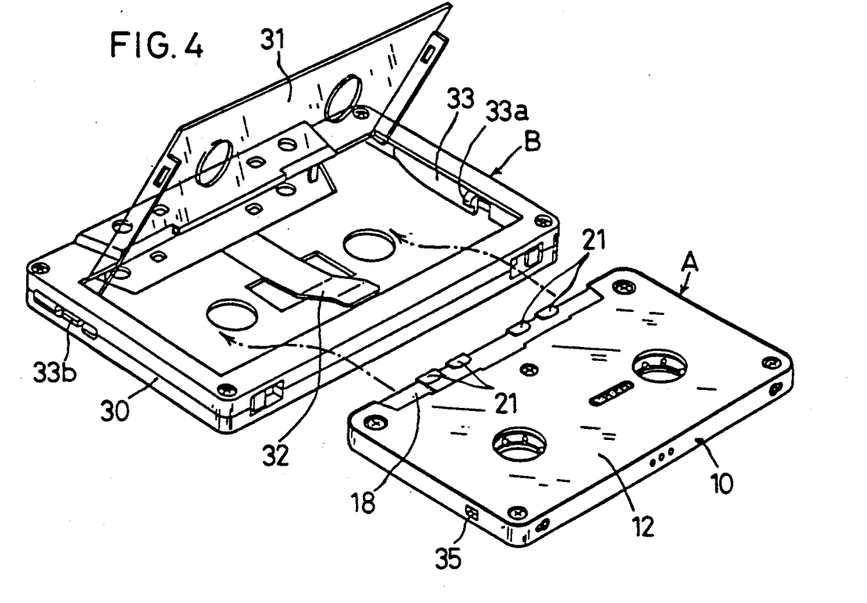
FIG. 4 is a perspective view of the embodiments of the tape cassette and the cassette adaptor according to this invention.

To assemble the tape cassette A, as shown in FIG. 1A, reel hubs at both ends of the magnetic tape 1 are inserted in reel holes through slip sheets (not shown) and the tape 1 is drawn into the feed paths 17 and the recess 16. Then the base portion 11 with the closure plates 18 is mounted, and after attaching the tape guides 21, the top plate 12 is put on through a slip sheet. The thus assembled cassette is screwed together (FIG. 4). The abovementioned slip sheets are well known and may be ones in the shape of the FIG. 8.

The cassette tape A has the closure plates 18 provided between the top and bottom plates 12 and 13 and the base portion 11. But in the embodiment shown in FIGS. 12 to 14 and that shown in FIG. 15, a flat box member is fitted outside the top and bottom plates 12 and 13.

Figure 12:
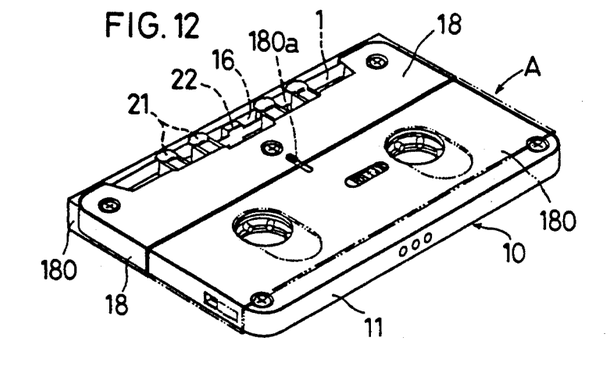
FIG. 12 is a perspective view of another embodiment of the tape cassette.
Figure 13:
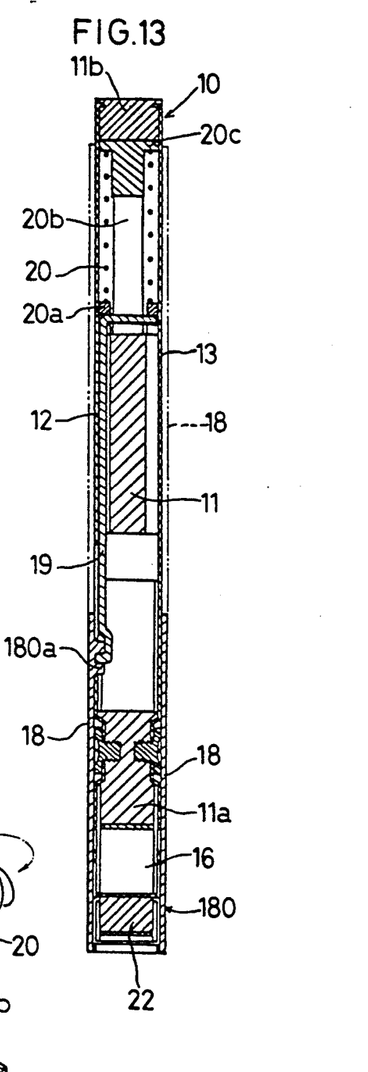
FIG. 13 is a sectional view of the embodiment of FIG. 12.
Figure 14:
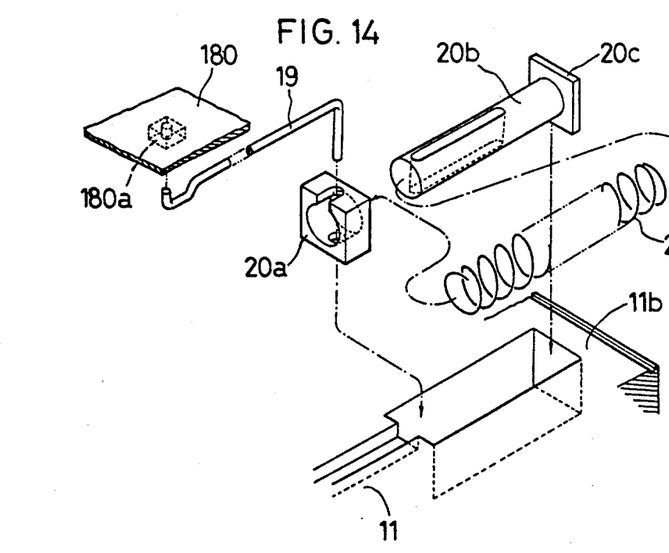
FIG. 14 is an exploded view, in perspective, of a portion of the tape cassette of FIG. 12.

Namely, a flat box member 180 having top and bottom plates 18 is movably mounted on the case 10. It may be transparent (as in the illustrated embodiment) or opaque and is made of synthetic resin or steel. It may have a length as shown by the solid lines or by the chain lines.

The flat box member 180 is biased forwardly by a spring 20 through a stopper 19 in the same manner as in the previous embodiment. In this state, the recess 16 is covered to protect the magnetic tape 1. As shown in FIGS. 13 and 14, the stopper 19 has one end inserted in a projection 180a formed on the inner periphery of the box-shaped member 180 and the other end fixed to a check plate 20a of the spring 20. The spring 20 is mounted around a cylindrical member 20b formed with a longitudinal slit in its intermediate portion and supported between the check plate 20a, movable with respect to the cylindrical member 20b, and a base 20c of the cylindrical member 20b.

Next, a cassette adaptor B adapted to be inserted in a conventional tape recorder with the tape cassette A mounted therein will be described.

The adaptor shown in FIG. 4 includes a known case 30 of a compact cassette (known as a "half" and it does not include a magnetic tape and hubs at both ends thereof). A transparent lid 31 is provided on top of the case 30 so as to be openable from the rear of the case 30. The lid 31 is opened to allow the tape cassette A to be mounted in the case 30. In the figure, numeral 32 designates a leaf spring for pushing up the cassette.

Engaging pieces 33 are pivotably mounted in both side walls of the case 30. Each engaging piece 33 has its front protruding end 33a biased by a spring into an engaging hole 35 in the tape cassette A, thus preventing the tape cassette A from jumping out. By pressing the rear end 33b of the engaging piece 33, its front end 33a will pivot backwards, thus coming out of the engaging hole 35. Thus, the tape cassette A will be pushed out of the case 30 by the leaf spring 32.

Figure 5:
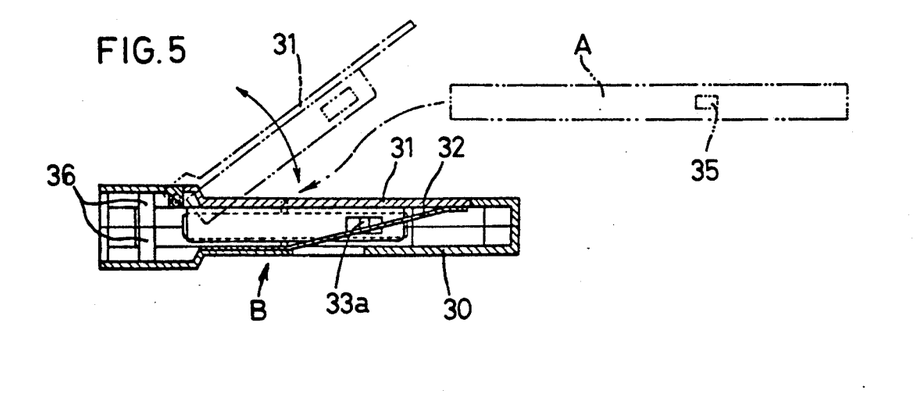
FIG. 5 is a cross-sectional view of the cassette adaptor showing how the tape cassette is mounted in the cassette adaptor.
Figure 6:
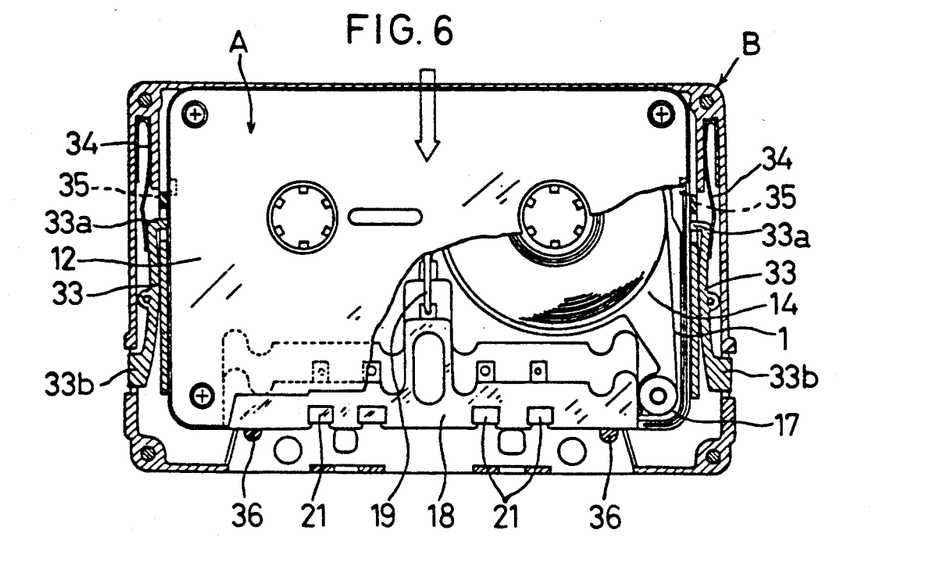
FIGS. 6 and 7 are plan views, partly broken away, of the cassette and cassette adaptor and illustrating the operation of the same.
Figure 7:
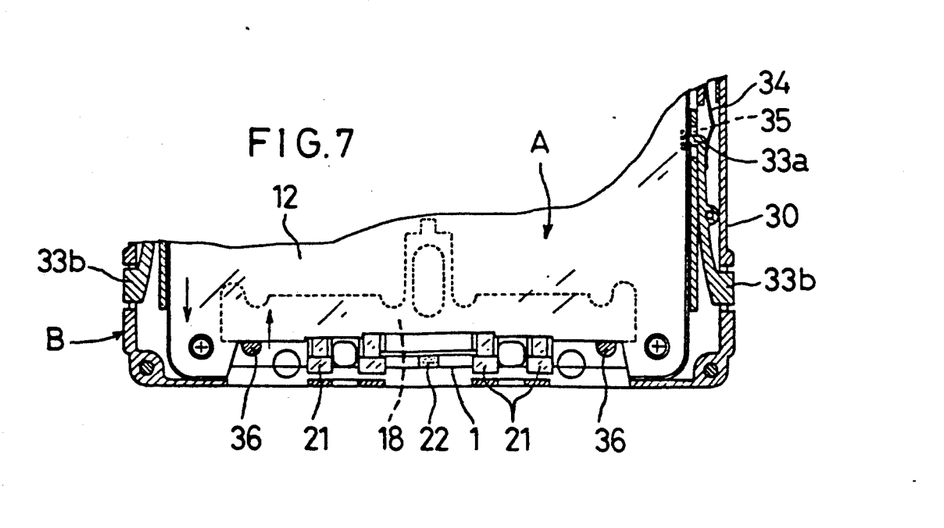
Figure 15:
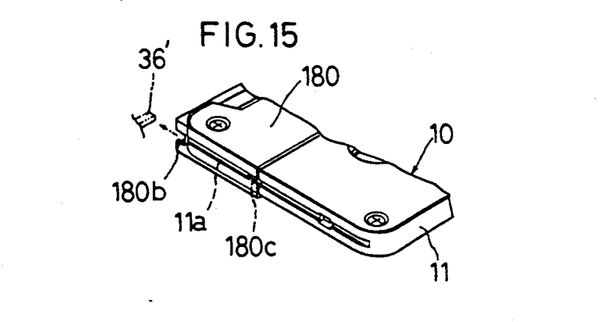
FIG. 15 is a view similar to FIG. 12, but showing only a portion of the cassette and its cooperation with a projection of a cassette adaptor or tape player.

Further, the case 30 is provided on the top and bottom inner surfaces thereof with protrusions 36, so that when the cassette tape A is inserted in the case as shown in FIG. 5, the projections 36 will abut the front edges of the closure plates 18 and then push the closure plates backwards as the cassette tape is inserted further as shown in FIG. 7 (in the embodiments of FIGS. 12 and 15, the box-shaped member 180 will be pushed backwards). Thus, the top and bottom of the recess 16 will be exposed. In this state, the tape cassette is inserted in the case, so as to assume a configuration similar to a conventional compact cassette tape, and can thus be inserted in a tape recorder for recording or playing.

When forming the closure plates 18 by punching, cut-and-raised projections 18a may be formed thereon so that when the cassette is inserted, the projections 18a will abut projections formed on the inner surface of the cassette (the latter projections do not have to protrude as much as the projections 36 and are long enough to abut the projections 18a reliably) and push the closure plates 18 backwards.

As shown in FIG. 15, the box-shaped member 180 may be formed with cutouts 180b in its front end at both sides, and projections 36' may be formed on the cassette adaptor so as to abut the box-shaped member 180 within the cutouts 180b. In this case, as shown in this figure, the base portion 11 should define grooves 11a in both sides thereof to receive the projections 36'. By further providing projections 180c on the inner surface of the box-shaped member 180 which extend in the grooves 11a, the projections 180c and the grooves 11a will serve as guides when the box-shaped member 180 moves.

Figure 9:
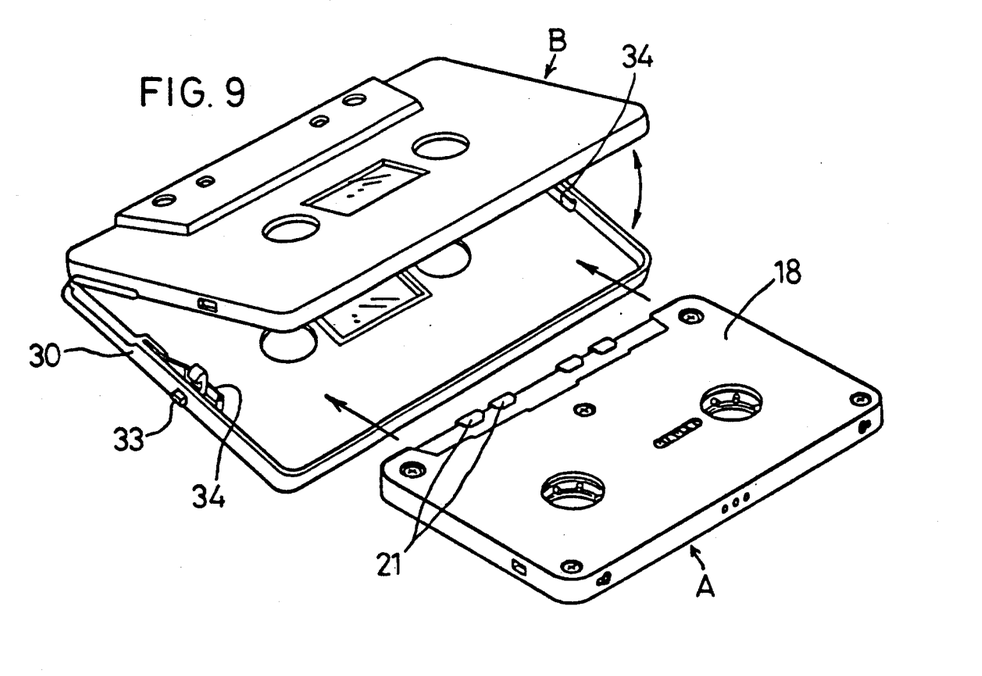
Figure 10:
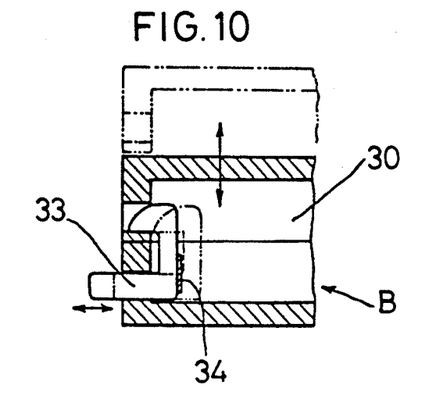
FIG. 10 is a sectional view of a portion of the adaptor shown in FIG. 9.
Figure 11:
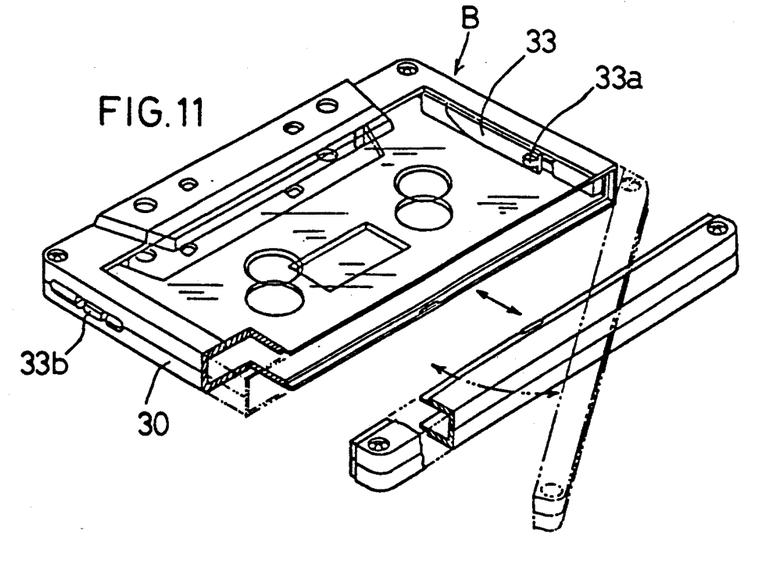

Besides the abovementioned type, the cassette adaptor B may be of a type into which the tape cassette A can be inserted from the rear surface of the case 30 as shown in FIG. 8, of a type having the rear portion of the case 30 detachable as shown in FIG. 11, or of a type having the case 30 separable in the direction of thickness as shown in FIGS. 9 and 10 so that the tape cassette A can be inserted by opening the case slightly. If the case is opened too wide, the projections (of the same type as the projections 36) will not abut the closure plates 18, making it difficult to expose the top and bottom of the opening 16. Also, engaging pieces 33, springs 34 and the like should be provided at one of the divided members of the case. These parts serve to keep the divided members of the case 30 coupled together and the springs 34 serve to push the sides of the tape cassette A. The members shown in FIG. 11 may be pivotably mounted as shown by chain lines.

The magnetic tape 1 of the cassette tape A may be used not only for recording and replaying analog sounds but as a digital audio tape (DAT) or a videotape.

As with the cassette holder B, a tape recorder for the tape cassette A only has to be provided with projections (corresponding to the projections 36 or 36') for moving the closure plates 18 or the plates of the box-shaped member 180 as the tape cassette A is inserted to expose the recess 16.

What is claimed is:

1. A tape cassette comprising: a pair of reel hubs; magnetic tape connected at ends thereof to said reel hubs, respectively, and wound thereon; and a case accommodating said pair of reels hubs and the magnetic tape wound thereon and having a front portion defining a front recess therein through which the magnetic tape is guided between the reel hubs; said case comprising a solid plate-like base portion and top and bottom plates respectively covering top and bottom surfaces of said base portion; said base portion defining winding openings therein in a thickness direction thereof extending between said top and said bottom surfaces, and feed path openings therein in said thickness direction at both ends of said front portion of the case, respectively, each of said feed path surfaces extending from a respective one of said winding openings to said front recess; said base portion having a solid front part defining a recess therein constituting said front recess of the case, a solid rear part, a solid bridge extending between and integrally connecting said front and said rear parts such that said front and said rear parts are contiguous to one another, and guide means at said front part for guiding the magnetic tape through said front recess; and said top and said bottom plates each defining cut-outs in respective front parts thereof corresponding to said front recess.

2. A tape cassette as claimed in claim 1, wherein the recess defined at the front part of said base portion is open at said top and bottom surfaces of the base portion, and further comprising closure plates disposed over said top and bottom surfaces of the base portion, respectively, and supported in the cassette so as to be movable between respective first positions at which the closure plates cover the recess at the top and bottom of the recess and respective second positions at which the closure plates leave the recess exposed, and springs mounted between said closure plates and said case, said springs biasing said closure plates to said respective first positions thereof.

3. A tape cassette as claimed in claim 2, wherein said closure plates and said springs are disposed between said base portion and said top and bottom plates, respectively.

4. In combination with the tape cassette of claim 2, a cassette adaptor for accommodating said tape cassette, said adaptor comprising a case defining an opening in one of a top and rear surface thereof and through which opening said cassette can be inserted in a forward direction toward the front of the case of the adaptor, and projections provided inside said case of the adaptor, said projections being disposed at locations at which the projections will abut the closure plates of said tape cassette as said tape cassette is inserted into the adaptor in said forward direction and cause said closure plates to move from said respective first to said respective second positions thereof against the biasing forces exerted by said springs.

5. In combination with the tape cassette of claim 3, a cassette adaptor for accommodating said tape cassette, said adaptor comprising a case defining an opening in one of a top and rear surface thereof and through which opening said cassette can be inserted in a forward direction toward the front of the case of the adaptor, and projections provided inside said case of the adaptor, said projections being disposed at locations at which the projections will abut the closure plates of said tape cassette as said tape cassette is inserted into the adaptor in said forward direction and cause said closure plates to move from said respective first to said respective second positions thereof against the biasing forces exerted by said springs.

6. In combination with the tape cassette of claim 2, a cassette adaptor for accommodating said tape cassette, said adaptor comprising a case having members which are movably mounted to one another to be separable in a direction of thickness of the case of the adaptor so as to allow said cassette to be inserted in a forward direction into a space in said case of the adaptor defined between said members, and projections provided at inner portions of said members, said projections being disposed at locations at which the projections will abut the closure plates of said tape cassette as said tape cassette is inserted into the adaptor in said forward direction and cause said closure plates to move from said respective first to said respective second positions thereof against the biasing forces exerted by said springs.

7. In combination with the tape cassette of claim 3, a cassette adaptor for accommodating said tape cassette, said adaptor comprising a case having members which are movably mounted to one another to be separable in a direction of thickness of the case of the adaptor so as to allow said cassette to be inserted in a forward direction into a space in said case of the adaptor defined between said members, and projections provided at inner portions of said members, said projections being disposed at locations at which the projections will abut the closure plates of said tape cassette as said tape cassette is inserted into the adaptor in said forward direction and cause said closure plates to move from said respective first to said respective second positions thereof against the biasing forces exerted by said springs.

* * * * *